United States Patent

[11] 3,622,389

[72] Inventors: Donald L. Brelsford; Kenneth J. Goering, both of Bozeman, Mont.
[21] Appl. No.: 38,993
[22] Filed: May 20, 1970
[45] Patented: Nov. 23, 1971
[73] Assignee: Montana Agricultural Research Corporation, Bozeman, Mont.

[54] PROCESSING OF SAPONARIA VACCARIA SEED
7 Claims, 1 Drawing Fig.

[52] U.S. Cl. .................................................. 127/67, 127/69
[51] Int. Cl. ....................................................... C13l 1/02
[50] Field of Search ......................................... 127/67, 68, 69

[56] References Cited
UNITED STATES PATENTS
2,368,668  2/1945  Langford ....................... 127/68

OTHER REFERENCES
Chemical Abstracts, 59:7855 g (1963)
K. J. Goering et al., Cereal Chemistry, 43 (1), 127–136 (Jan. 1966)

Primary Examiner—Morris O. Wolk
Assistant Examiner—Sidney Marantz
Attorney—Merchant & Gould ABSTRACT: Saponaria vaccaria seed is dehulled and degermed to form a crude starch. The crude starch from this seed, in the form of an aqueous slurry, is then treated to dissolve the protein matrix, thereby releasing insoluble pigment impurities. The pigment impurities separate from the resulting solution by gravity (i.e., flotation and sedimentation). Suspended starch granules are then separated from the protein-containing solution and thereafter refined.

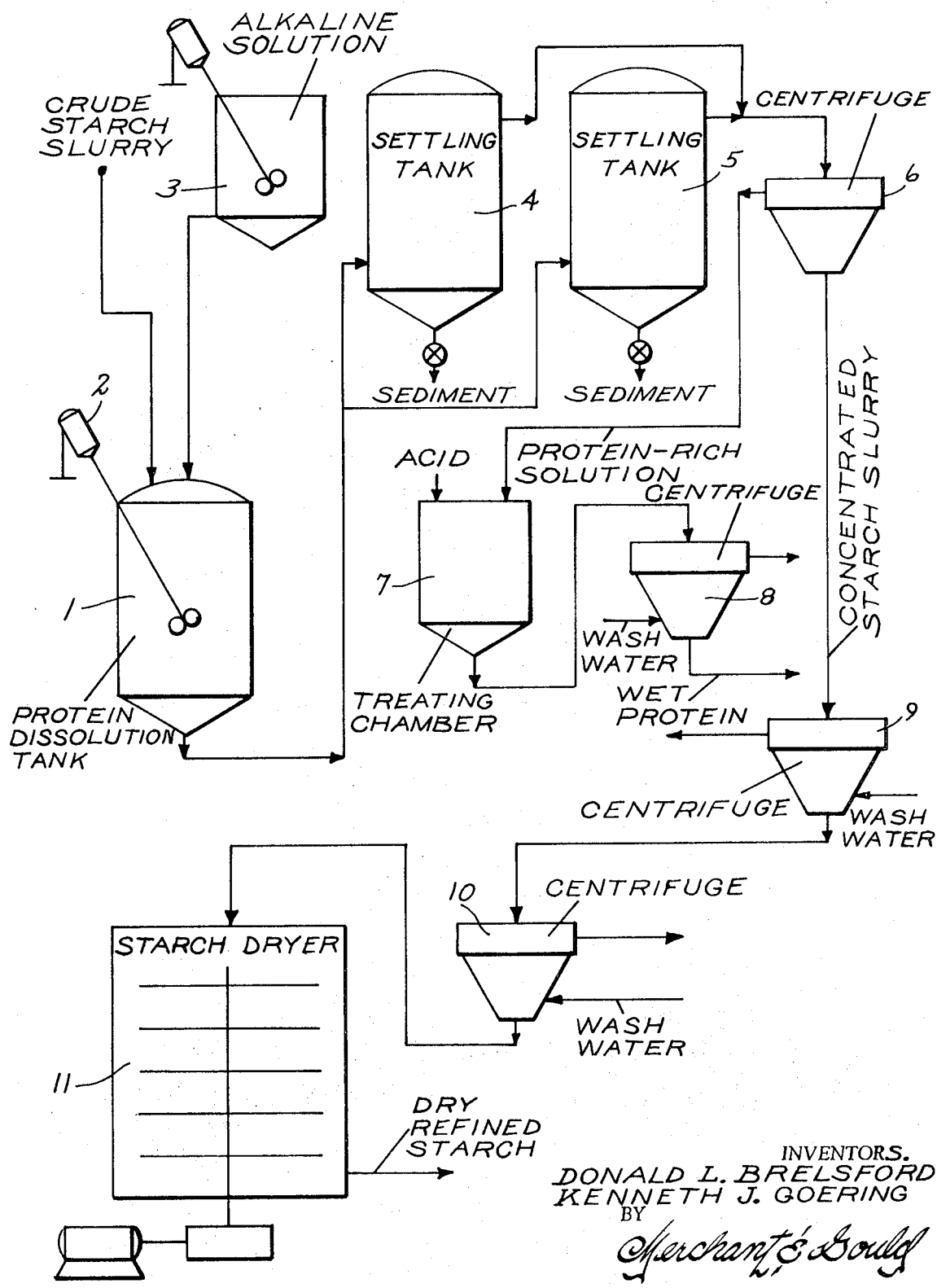

PROCESSING OF SAPONARIA VACCARIA SEED

BACKGROUND OF THE INVENTION

In recent years, research efforts have been directed in search of plants that can be efficiently utilized as sources of raw materials for various industries. In an article entitled *New Starches*, Cereal Chemistry, Vol. 43, No. 1, Jan. 1966, we described the unusual properties of starch which we obtained from *Saponaria vaccaria* seed. Unfortunately, starch derived from this seed is present as extremely small granules and their purification or refinement has been difficult.

If *Saponaria vaccaria* seed is to become a cash crop, as opposed to its present status as a noxious weed, a commercially useful refining process must be developed for the starch.

SUMMARY OF THE INVENTION

The present invention is a commercially useful process for treating *Saponaria vaccaria* seed to obtain a refined starch meeting present commercial standards (e.g., standards of whiteness).

Briefly described, the process of the present invention involves dehulling and degerming *Saponaria vaccaria* seed. This can be accomplished by conventional wet milling techniques or, less preferably, by dry milling techniques. In either event, an aqueous slurry of dehulled, degermed seed (i.e., a crude starch slurry) will be obtained or prepared as a starting material for the refining process of the present invention. Next, the starch slurry is treated to dissolve the protein matrix of the dehulled, degermed seed. This is accomplished by raising the pH by alkali addition (e.g., to a pH of 11). As the protein is dissolved, alkaline insoluble pigment impurities are released from the seed and these impurities can be separated from the slurry by gravity. Under quiescent conditions, the insoluble pigment impurities float to the surface as a scum and settle as a sediment. The protein solution containing suspended starch granules is then separated from the pigment impurities and the starch granules are removed from the protein solution (e.g., removed by centrifuging). The protein-rich solution is then treated by conventional processing to obtain a dry protein concentrate (e.g., 70 percent isolated protein). The separated starch granules (separated as a starch-rich slurry) are subsequently washed and dried. The resulting starch is a white, low protein, commercially acceptable material.

THE DRAWING

The drawing is a flow diagram illustrating the process of the present invention.

DETAILED DESCRIPTION

*Saponaria vaccaria*

The plant *Saponaria vaccaria* is native to the Western United States (e.g., Montana). It produces substantial amounts of seed and is generally considered to be a noxious weed. The plant is sometimes referred to as cow cockle, cow soapwort, or cow fat.

Our previous research has shown that the plant *Saponaria vaccaria* has very favorable agronomic characteristics. The germ amounts to nearly 10 percent by weight of the seed composition. The germ is readily separable by flotation and is high in both protein and oil. The oil can be separated from the germ to thereby produce a deoiled germ having an unusually high protein content (compared to common grain) without further concentration. The oil has a high vitamin E content and a fatty acid composition of the corn oil type.

Starch granules of *Saponaria vaccaria* are very small (i.e., about one-fourth the size of rice starch granules). Crude starch obtained from *Saponaria vaccaria* (i.e. the starch obtained after dehulling and degerming *Saponaria vaccaria* seed) contains dark colored pigment impurities which cause refinement of the starch to be difficult.

The Feed Material

The present process uses as a feed material an aqueous slurry of crude starch. This slurry can be the crude starch slurry obtained by dehulling and degerming *Saponaria vaccaria* seeds by standard wet milling techniques (e.g., wet milling processes as used on corn). Alternatively, a crude starch slurry can be prepared from the flour or crude starch obtained by dry milling *Saponaria vaccaria* seed to remove the hulls and germ (e.g., dry milled as wheat). The solids contents of the crude starch slurry can vary considerably, but will normally be within the range of 2–20 percent (e.g., 4–10 percent).

Dissolving the Protein

The ph of the crude starch slurry is then raised by addition of appropriate alkaline materials (e.g., aqueous sodium hydroxide). The purpose of the addition of an alkaline material is to raise the pH to thereby dissolve the protein matrix present in the crude starch without damaging the starch granules (e.g., without damaging them by bursting or gelatinizing them). The rate at which the protein will dissolve is a function of time, temperature, and pH. Under most conditions, a pH above 12 is undesirable and should be used only with care, since such a high pH may cause damage to the starch granules. Normally the pH will be above 7.5 and within the range of 7.5 to 11.5 with optimum results generally occurring within the range of 10 to 11. At a pH of about 7.5, the percent protein in the refined starch drops to about 2 percent, while at pH's of 10–11, it is at or below 1 percent. At a pH of approximately 11 (obtained by sodium hydroxide addition), satisfactory protein dissolution can be obtained at room temperature with normal agitation in about 1 hour. Temperatures above 60° C. tend to damage or degrade the starch and should normally be avoided.

If desired, other adjuvants (e.g., buffers, alcohols, etc.) can optionally be added to the slurry.

Suitable alkaline materials include the alkali and alkaline earth metal oxides and hydroxides (e.g., aqueous sodium hydroxide, powdered calcium hydroxide), as well as other alkaline materials as known to the art. Mixtures of alkaline materials can be used. We prefer to use dilute aqueous sodium hydroxide (e.g., at a concentration of 1 percent for dissolving the protein. Dilute solutions of basic materials (e.g., sodium hydroxide) are preferred since concentrated solutions (e.g., 10 weight percent NaOH) may cause gelatinization of the starch granules when the base is added to the crude starch slurry. The selection of a suitable alkaline material or mixture thereof and an appropriate concentration will be within the skill of the art when aided by this disclosure.

Release and Separation of Pigment Impurities

Dissolving the protein matrix frees pigment impurities which interfere with starch refinement. We have found that these pigment impurities are alkaline insoluble and they will separate as a solid phase from the starch slurry by gravity (e.g., sedimentation or flotation) usually within 60 minutes. The pigment impurities are very dark in color and, when isolated, are grey to coffee colored. By analysis, these pigment impurities generally contain less than 10 percent protein.

Next, the aqueous phase of the alkaline starch slurry is separated from the insoluble pigment impurities (e.g., by decanting). Care should be exercised in separating the pigment impurities from the alkaline slurry so that the small starch granules that are in suspension are not removed at the same time. Gravitational techniques (e.g., settling out the heavier pigment impurities under quiescent conditions) are particularly effective and are preferred. Then, the alkaline slurry can be drawn-off or decanted without substantial loss of starch.

Separation of Starch

Next, the suspended starch granules are separated from the alkaline starch slurry (e.g., separated by centrifuging). Since the protein is present in dissolved form and the pigment impurities have been removed, this separation can be made quite easily and techniques are known in the grain-processing art which will make an effective separation (e.g., centrifuging, filtering, etc.)

Recovery of Protein

The remaining solution, now free of starch granules and rich in dissolved protein, is further processed to recover the protein. For example, the protein can be precipitated by acid addition to the isoelectric point (about 4.5—5.0 pH) followed by centrifuging, washing, and drying to produce an isolated protein.

Recovery of Starch

The separated starch granules (now in the form of a concentrated starch slurry) are further refined using techniques known to the seed processing art. For example, the concentrated starch slurry can be repeatedly diluted with fresh water and centrifuged to obtain a cleaner, whiter starch. The resulting wet product can then be dried to form a refined starch.

The Process as shown in the Drawing

The process of this invention can be further understood by reference to the drawing and the following description.

The feed material is, for example, a crude starch slurry obtained by the wet milling of Saponaria vaccaria seeds (i.e., it is a dehulled, degermed product). The slurry contains approximately 10 percent solids (i.e., crude or unrefined starch). The slurry is introduced into a protein dissolution tank 1 which is equipped with an agitator 2. A reservoir 3 is provided for storing alkaline solution (e.g., aqueous sodium hydroxide) which is introduced into protein dissolution tank 1 in an amount sufficient to raise the pH of the slurry to, for example, 11. Dissolution of the protein is accomplished with agitation in tank 1 in approximately 1 hour. The resulting alkaline slurry is then passed to settling tanks 4 and 5 which are operated alternately. In settling tanks 4 and 5, the alkaline starch slurry is permitted to rest so that the alkaline insoluble pigment impurities can separate from the slurry by gravity (i.e., settling or floating). The time allowed for separation is 1 hour. The remaining aqueous phase (now free of pigment impurities) is then passed to centrifuge 6 where the alkaline slurry is separated into a concentrated starch slurry and a protein-rich solution. The protein rich solution (now substantially free of starch granules) is then passed to a treating chamber 7 where the protein in solution is precipitated by addition of dilute sulfuric acid to lower the pH to the isoelectric point. The protein precipitate is then processed by washing and separating wet protein which is thereafter dried to produce an isolated or concentrated protein. The concentrated starch slurry obtained from centrifuge 6 is then processed by repeated washing and centrifuging in centrifuges 9 and 10. The wet refined starch from centrifuge 10 is then dried in dryer 11 to form a refined starch.

The present invention is further illustrated by the following example.

EXAMPLE

Laboratory Procedure for Preparing a Crude Starch Slurry

After farm harvest, the Saponaria vaccaria seed is mechanically cleaned by sifting, blowing and sizing to remove and discard cracked seed, foreign seeds, stems, straw, dust and the like.

The first laboratory step in processing the seed is to wash it. To do this, warm wash water, usually at about 26°–30° C. is mixed with the seed. The seed and water are mildly agitated, then the wash water is poured off. This wash step is repeated a second time. In washing the seed, dirt, dust, and other foreign external contaminants are largely removed from the seed.

After washing, the seeds are ready for steeping or softening in preparation for milling and separating the components. The steep water solution can be made up by dissolving 0.5 percent $Na_2S_2O$(by weight) in water. The steep water is added to the seeds, in a suitable container, to a depth sufficient to allow room for soaking the seeds and for expansion by swelling of the seeds. During the steeping process, the steep water (and seeds) is desirably maintained at a temperature of about 38°–49 C. If the steeping temperature is allowed to rise up to 60° C. or higher, the starch granules in the seed will begin to burst on gelatinization of the starch and the present starch refining and recovery process cannot be carried out.

After steeping for 24 hours, the steep water contains substantial amounts of dissolved material and the seeds are becoming soft. The steep liquor is poured off the seeds and the seeds are washed in warm water. Fresh, warm steep water is added (0.5 percent weight $Na_2S_2O_5$) and the seeds and steep water are again held at 38°–49° C. for 24 hours to complete the steeping and softening process. The steeping process can probably be of shorter time than this; however, the above procedure is convenient for batch laboratory processing schedules.

After the second 24 hour steeping period, the steep water is again removed from the seeds, Fresh, warm water is added and the softened seeds are ready for wet milling.

In the laboratory, the wet milling or grinding of the softened seed is conveniently carried out by use of a Waring Blender. Three-hundred ml. of warm water is added to about 100 gm. of steeped, softened seeds. This mixture is poured into the Waring Blender, and ground for about 5 minutes. In this grinding step, the soft hulls are broken and opened up, allowing the germ and starch inside to be freed. The agitation and grinding by the Waring Blender ensure that most of the starch is free and dispersed into the water slurry. At this point in the processing operation, the solids content of this wet ground slurry is about 25 percent by weight, the major components of which are hulls, germ, crude starch and water solubles.

Next, this slurry of whole ground seed is screened to remove the hulls and germ from the crude starch slurry. In practice, most of the hulls and germ fragments can be removed from the slurry by use of a 40-mesh screen. However, after removal of most large seed fragments on the 40-mesh screen, the slurry can be further screened through 150- and 270-mesh screen, to remove, to the largest practical degree, the insoluble seed fragments. Because of the steeping-softening process, the crude starch is made up of particles generally much smaller than the 270-mesh opening. After the fragments of hulls, germ and gluten have been screened away, the slurry is about 15 percent by weight insoluble crude starch plus about 5 percent by weight of water soluble materials.

Refining the Crude Starch

A 100 ml. portion of well-mixed crude starch slurry is placed in a 1,000 ml. beaker. To this is added 300 ml. of water and the mixture is well agitated. The resulting slurry is about 4 percent solids by weight, and probably has a pH of about 6.0 to 6.5. The appearance of the slurry is grey.

To this dilute crude starch is added aliquots of dilute alkali solution (1 percent wt. NaOH) and the resulting pH is measured and recorded. The following table indicates how the pH of this crude starch slurry changes with alkali addition. At a pH of about 7.5, the starch slurry takes on a yellow-green opaque color in contrast to the grey, dirty color of the original crude starch slurry at pH 6 to 6.5.

| Alkali Added (ml. of 1% NaOH) | pH of Slurry |
| --- | --- |
| 0 | 6.3 |
| 5 | 7.3 |
| 15 | 9.4 |
| 25 | 10.5 |
| 35 | 10.9 |
| 45 | 11.2 |
| 55 | 11.3 |
| 65 | 11.4 |
| 85 | 11.5 |

From experimental analyses and evaluating the resulting residual protein content of the refined starch at various pH levels, it was found that the optimum range of low protein impurity in the starch and minimum alkali solution requirement occurs at pH of 10–11.

After the desired pH level is reached, the alkali-treated crude starch slurry is agitated and then poured into a 500 ml. separatory funnel. The funnel is placed in a rack and the pigment impurities that have been freed by the alkali dissolution of the protein matrix, are allowed to settle to the bottom. About 2 hours is adequate time for this. If desired, separation can be speeded up by various centrifugal means for efficient commercial processing, such as liquid cyclones, centrifuges, etc.

After the dark grey to brown-black pigment impurity material has settled to the bottom of the separating funnel, it is drawn off. The remaining starch slurry is light in color with a yellow-green tint.

Into two glass centrifuging bottles are placed 200 ml. each of the remaining starch slurry. This starch slurry is then centrifuged in a 15-inch diameter bottle centrifuge at 1,500 r.p.m. for a period of 10 minutes. After this is done, the starch is in a cake in the bottom of the bottles and the yellow-green alkali solution with dissolved protein is the supernate. The supernate is poured off, and the refined starch is removed and repeatedly resuspended in fresh wash water, and centrifuged until the traces of alkali and soluble protein are adequately removed. The final refined and washed starch is then placed in an open container for air drying and later use.

What is claimed is:

1. The process which comprises:
   a. raising the pH of an aqueous slurry of dehulled, degermed *Saponaria vaccaria* seed to thereby dissolve protein contained therein and form an alkaline slurry;
   b. separating alkaline insoluble pigment impurities from said slurry; and
   c. subsequently separating granules of *Saponaria vaccaria* starch from said slurry.

2. Process of claim 1 wherein the pH of said alkaline slurry is within the range of 7.5–11.5.

3. Process of claim 2 wherein sodium hydroxide is used to raise the pH of said aqueous slurry in step a.

4. Process of claim 3 wherein said pigment impurities are separated from said alkaline slurry by gravity.

5. Process of claim 4 wherein said granules of starch are separated from said slurry by centrifuging.

6. Process of claim 5 wherein said separated starch granules are further refined and dried.

7. The process of treating *Saponaria vaccaria* seed which comprises:
   a. wet milling *Saponaria vaccaria* seed to obtain a dehulled, degermed crude starch slurry;
   b. agitating the crude starch slurry at a temperature below 60° C. while adding dilute aqueous sodium hydroxide in an amount sufficient to raise the pH to about 10–11;
   c. continuing the agitation for at least 30 minutes to thereby dissolve protein contained in said crude starch;
   d. allowing the slurry to rest without agitation so that insoluble matter can separate by gravity to thereby form solid and aqueous phases;
   e. separating said aqueous phase from said solid phase;
   f. centrifuging said aqueous phase to thereby form a concentrated starch slurry and a protein rich solution;
   g. separating protein from said protein-rich solution;
   h. washing said concentrated starch slurry; and
   i. removing water from said concentrated starch slurry to thereby obtain refined, dry *Saponaria vaccaria* starch.

* * * * *